United States Patent [19]
Tangorra et al.

[11] B 3,924,670
[45] Dec. 9, 1975

[54] PNEUMATIC TIRE FOR VEHICLE WHEELS

[75] Inventors: Giorgio Tangorra; Italo Bertelli; Giovanni Calori, all of Milan, Italy

[73] Assignee: Industrie Pirelli S.p.A., Milan, Italy

[22] Filed: May 29, 1973

[21] Appl. No.: 364,334

[44] Published under the Trial Voluntary Protest Program on January 28, 1975 as document no. B 364,334.

[30] Foreign Application Priority Data
May 31, 1972 Italy .................................. 25140/72

[52] U.S. Cl. ......... 152/375; 152/353 C; 152/362 R; 152/379; 152/397; 152/395
[51] Int. Cl.² .................... B60C 15/02; B60C 17/00
[58] Field of Search ........... 152/375, 379, 309, 381, 152/384, 386, 387, 388, 395, 397, 398, 304, 152/362, 353 C

[56] References Cited
UNITED STATES PATENTS

| | | | |
|---|---|---|---|
| 817,957 | 4/1906 | Christy | 152/395 |
| 957,413 | 5/1910 | Constantin | 152/379 |
| 1,195,512 | 8/1916 | Schwarz | 152/395 |
| 1,277,516 | 9/1918 | Williams | 152/375 |

*Primary Examiner*—Drayton E. Hoffman
*Attorney, Agent, or Firm*—Stevens, Davis, Miller & Mosher

[57] ABSTRACT

A pneumatic tire and wheel assembly comprising a tire provided with two sidewalls, each of which has at least one hinge, and in which the section midline has a concavity turned towards the outside, characterized in that each bead is encased in a corresponding seat of the rim of said wheel, each seat having the shape of a channel, with a supporting base and two lateral walls, which extends along the whole circumferential development of the rim; at least a part of the axially outermost zone of the bead is radially compressed between the base of the channel and a circumferentially inextensible annular element; and the radial innermost development of the annular element is smaller than the radially outermost development of the axially outer lateral walls of the seats of the rim.

2 Claims, 8 Drawing Figures

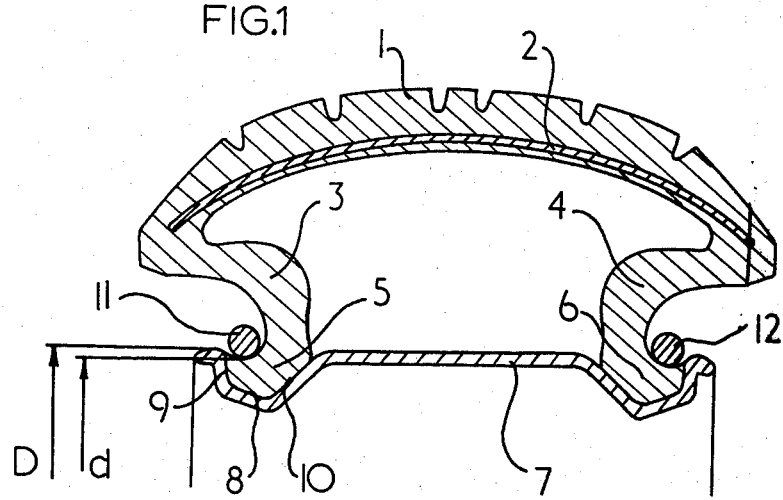

PNEUMATIC TIRE FOR VEHICLE WHEELS

BACKGROUND OF THE INVENTION

The present invention relates to pneumatic tires for vehicle wheels and, more precisely, it concerns the anchorage of the beads of the tires to the corresponding rim. The present invention was developed especially but not exclusively for use with the pneumatic tire described in U.S. application Ser. No. 273,337 to Giorgio Tangorra, filed July 19, 1972 now U.S. Pat. No. 3,805,868.

The Tangorra application Ser. No. 273,337 described a pneumatic tire comprising a tread provided with an inextensible annular structure and two sidewalls, in which the section midline is concave towards the outside even under the action of service pressure; moreover the sidewalls have at least one zone, and preferably two, with a lesser resistance to flexion than that of the remaining parts of the sidewall. The tire described in application Ser. No. 273,337 has the typical feature that its sidewalls operate prevailingly under compression. This is because each sidewall is locked in particular against two fixed points, respectively constituted by the edge of the inextensible annular structure and by the rim, which prevent it from inverting the direction of its curvature. Owing to this particularity, the sidewalls and the beads of the tire can also be constituted by homogeneous material, as for instance a rubber compound devoid of any continuous reinforcing structure of the type normally used in conventional tires, as for instance cord-fabric or cores; therefore the sidewalls and beads can be formed in the desired thickness and shape, by means of a simple pouring or molding process. In the tires described in the Tangorra application it can be advantageous to have a firm anchorage between the beads and the rim, particularly when the inner service pressure is lacking, in order to avoid the possibility of a separation taking place between the tire and the rim due to deflation of the tire, which would make control of the vehicle extremely difficult.

SUMMARY OF THE INVENTION

Accordingly, the present invention is directed to some systems for providing a firm anchorage between the tire and the rim.

An object of the present invention is a pneumatic tire and wheel assembly comprising a tire provided with two sidewalls, each of which has at least one hinge, and in which the section midline has a concavity turned towards the outside, for example, of the type described in the aforementioned Ser. No. 273,337 characterized in that each bead is encased in a corresponding seat of the rim of said wheel, each seat having the shape of a channel, with a supporting base and two lateral walls, which extends along the whole circumferential development of the rim; at least a part of the axially outermost zone of the bead is radially compressed between the base of the channel and a circumferentially inextensible annular element; and the radially innermost development of the annular element is smaller than the radially outermost development of the axially outer lateral walls of the seats of the rim.

Preferably, the annular element is constituted by at least one shaped metallic element having a circular section or by a metal cord of circular section comprising a plurality of metal wires twisted together.

According to an alternative embodiment of the invention, the annular element is embedded in a shaped rubber element, the cross section of the annular element being arranged eccentrically with respect to that of the shaped rubber element, the rubber element being provided with an appendix intended to be received into an appropriate groove obtained on the radially outer surface of the bead, the groove extending along the whole circumferential development of the bead.

Preferably, the shaped rubber element has a hardness of the same order as, or greater than, that of the compound forming the bead of the tire.

According to another alternative embodiment, the inextensible annular element is constituted by a metallic wire wound up about the bead, already fitted on the rim, in a plurality of parallel coils, the ends of the wire being appropriately connected together according to already known systems.

According to a further alternative embodiment, the inextensible annular element is constituted by a rubberized strip of metal cords arranged side-by-side and oriented along a direction parallel to the circumferential direction of the tire.

BRIEF DESCRIPTION OF THE DRAWING

The invention will now be better illustrated with reference to the attached drawings, given by way of example, in which:

FIG. 1 represents the cross section of a tire according to the invention;

DESCRIPTION OF THE PREFERRED EMBODIMENTS

Figure 2A:
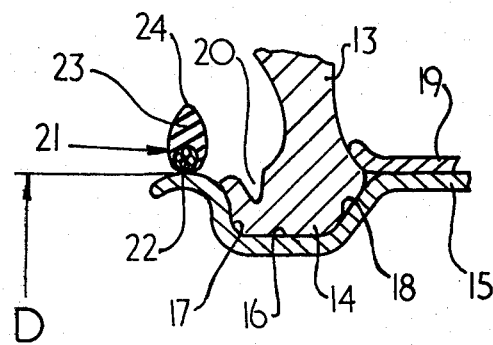
FIGS. 2a and 2b represent an alternative embodiment of the present invention, the annular element being shown in two subsequent positions for a better understanding of the assembling operations.

FIG. 1 represents the cross section of a tire comprising a tread 1, a reinforcing structure 2, two sidewalls 3 and 4 and two beads 5 and 6; the beads are encased in the corresponding seats of rim 7. Each seat is shaped as a channel extending along the whole circumferential development of the rim, and has a supporting base 8 and two lateral walls 9 and 10. A more complete description of the tire is found in Tangorra application Ser. No. 273,337.

The axially outermost zone of each bead is radially compressed between the supporting base 8 and a circumferentially inextensible annular element 11, constituted by a steel shaped element of circular section. The annular element, which could also be constituted by a metal cord comprising a plurality of metal wires twisted together, has a diameter $d$ smaller than the diameter $D$ of the lateral wall 9 of the rim seat; in this way, the lateral wall 9 constitutes an obstacle which prevents the annular element 11 from coming off the rim after having been assembled on the bead 5.

The assembling of the above described parts (tire, rim, annular elements) is carried out by first fitting the tire 1 on the rim 7, care being taken that the beads 5 and 6 are encased in their corresponding channel-shaped seats. As the beads 5 and 6 are fully constituted by a rubber compound, without any conventional textile reinforcement, they are circumferentially extensible and their radially lower diameter can be, for purposes of mounting, easily made to exceed the diameter D of the axially outermost wall 9 of the rim 7 (also called "flange"), by using normal levers commonly adopted for fitting conventional tires.

When the beads 5 and 6 are encased in the respective seats of the rim, the first annular element 11 is mounted by resting a part of its inner circumferential development on the outer surface of the bead while the diametrically opposite part of the annular element 11 is kept in an axially outer position with respect to the rim flange; by means of appropriate assembling levers already known per se, the annular element is completely lifted by compressing it against the thickness of rubber forming the bead on which it is rested, allowing therefore the diametrically opposite part to overcome the rim flange. In this way the annular element 11 will rest on bead 5 for the whole circumferential development of the latter. The axially innermost wall 10 of the rim seat constitutes a support for the bead 5, preventing the latter from being displaced in an axially inner direction during the assembling of the annular element 11.

An analogous operation is repeated for the second annular element 12 concerning bead 6; after having carried out the assembling, the tire is inflated; inflation subjects the two sidewalls 3 and 4 to compression, and automatically ensures air tightness between the beads 5 and 6 and the rim 7. The two beads 5 and 6 are consequently firmly anchored into their corresponding seats, and cannot become detached from these even in the event of a possible lack of pressure inside the tire.

Figure 2B:
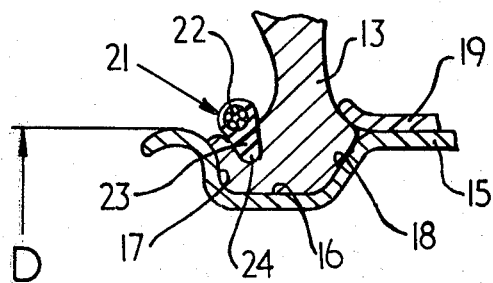

FIGS. 2a and 2b represent an alternative embodiment of the present invention, in which a bead 13 is encased in the corresponding seat 14 of the rim 15; the seat is shaped as a channel extending along the whole circumferential development of the rim, and has a supporting base 16 and two lateral walls 17 and 18. The axially inner part of the bead 13 is engaged with a spacing ring 19, which serves to better ensure the arrangement of the bead in its own seat. The radially outer surface of the axially outer part of the bead 13 is provided with a circumferential groove 20 intended to receive the annular element 21 having a section of ovoidal shape. Annular element 21 is constituted by a metal cord 22, completely embedded in a shaped rubber element 23 eccentrically molded about the metal cord in order to form an appendix 24; said appendix can be molded radially outwardly as shown in FIG. 2a or radially inwardly in respect of the metal cord 22. The lower diameter D of the annular element 21 coincides with the diameter of the flange 17; in this way, after having assembled the bead 13 in the seat 14 of the rim 15 as described in the preceding example, the annular element can be positioned on the flange 17.

By pushing the annular element 21 in a radially inner direction and by simultaneously rotating it around the center of the metal cord 22, the appendix 24 is caused to pass from its radially outer position with respect to cord 22 to a radially inner position with respect to it; at the same time appendix 24 is arranged in the groove 20 of the bead 13, as illustrated in FIG. 2b, thus obtaining the anchorage of the bead itself. The dimensions of the rubber element 23 are such that, in accordance with the dimensions of the corresponding circumferential groove 20, it is possible to obtain on the bead, besides a thrust in the radial direction, also a thrust in the axial direction, by virtue of the flaring of seat 20; this feature makes the anchorage of the bead 13 in its own seat 14 more efficient.

Figure 3A:
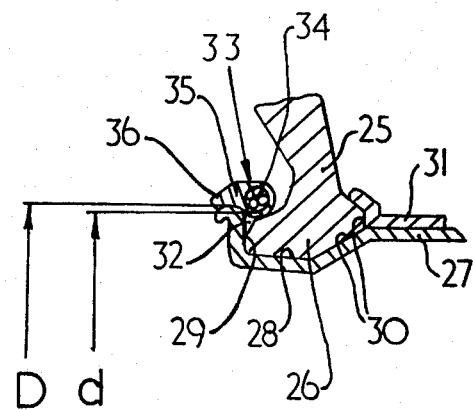
FIGS. 3a and 3b represent a further alternative embodiment of the invention, the annular element being shown in two subsequent positions for a better understanding of the assembling operations.
Figure 3B:
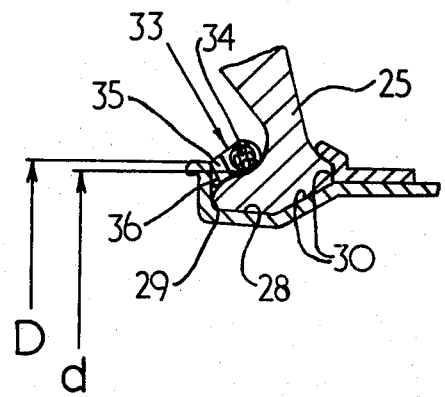

FIGS. 3a and 3b represent a further alternative embodiment of the present invention, in which a bead 25 is encased in the corresponding seat 26 of the rim 27. Seat 26 is shaped as a channel extending along the whole circumferential development of the rim, and has a supporting base 28, an axially outer lateral wall 29 (or flange) and an axially inner wall 30, constituted in part by the profile of the same seat 26 and in part by the profile of the spacing ring 31, interposed between the two beads of the tire. The profile of the axially outer part of the bead 25 forms with the profile of the flange 29 a groove 32 intended to receive a part of the annular element 33.

The annular element 33 is constituted by a metal cord 34, completely wound up with a shaped rubber element 35, molded eccentrically about the metal cord so as to form an appendix 36 whose section profile is intended to be coupled with the groove 32. The metal cord 34 has a diameter $d$ smaller than the diameter D of the flange 29 and the fitting between the annular elements 33 and the bead 25 is carried out analogously to that described with respect to FIG. 1, with the only expedient of maintaining the shaped rubber element 35 always in an axially outer position with respect to the metal cord 34, so that it is situated in the appropriate groove 32, as shown in FIG. 3b. In this way, the metal cord 34 exerts a radial compression on the bead 25, which rests on the base 28 of the seat 26, while the shaped rubber element 35, with its appendix resting on the flange 29, exerts an axial thrust on the same bead against the inner wall 30.

Figure 4:
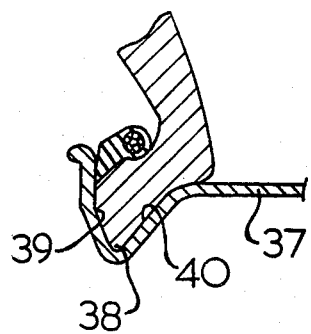
FIGS. 4, 5 and 6 represent further alternative embodiments of the present invention.

FIG. 4 represents an anchorage analogous to that represented in FIG. 3b, in which the profile of the bead and that of the corresponding seat of the rim are modified. The section profile of the seat of rim 37 is in fact V-shaped, and is constituted by a supporting base 38, having a width smaller than that represented in the preceding examples, and by two lateral walls 39 and 40 having a width much greater than the width of the supporting base.

Figure 5:
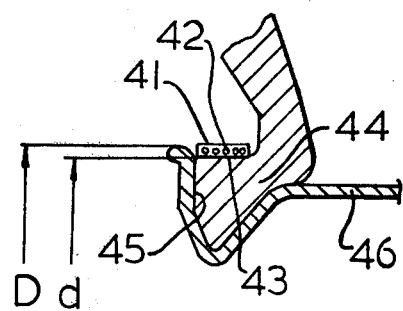

FIG. 5 represents an anchorage analogous to that shown in FIG. 4, in which the circumferentially inextensible annular element is constituted by a strip 41 of rubberized metal cords 42 disposed side-by-side and oriented along the circumferential direction. Strip 41 rests on the cylindrical surface 43 of the bead 44 and has a diameter $d$ smaller than the diameter D of the flange 45 of the rim 46. The assembling of strip 41 is carried out in a manner to that described with reference to FIG. 1.

Figure 6:
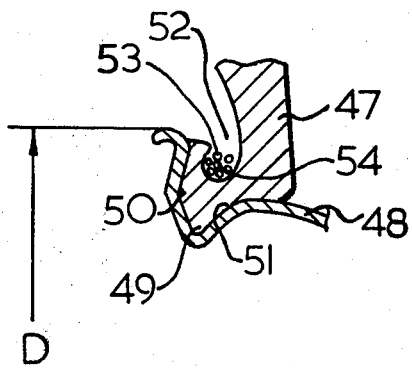

FIG. 6 represents a still further alternative embodiment of the invention, in which the bead 47 is encased in the corresponding seat of the rim 48, constituted by a supporting base 49 and by two lateral walls 50 and 51. The radially outer surface of the axially inner part of the bead 47 is provided with a circumferential groove 52 intended to receive the annular element 53. Annular element 53 is constituted by a metal wire 54 and has a diameter smaller than the diameter D of the flange 50, said metal wire 54 being wound up in a plurality of parallel coils about the bead 47 after the positioning of the latter in its own seat of the rim; the ends of metal wire 54 (not visible in the Figure) are then appropriately connected by means of conventional known systems, so as to compress the bead 47 against the supporting base 49 of the rim, thus ensuring the anchorage of the two parts.

It is understood that the above described examples are not limiting and that the scope of protection of the present invention is limited only by the hereafter appended claims and includes any other alternative embodiment deriving from the above indicated inventive concept.

What is claimed is:

1. A pneumatic tire and wheel assembly comprising a tire provided with a tread portion, two bead portions, and two sidewalls, the section midlines of said sidewalls having a concavity turned towards the outside, a wheel for mounting said tire, said wheel having channel-shaped seat portions, with a supporting base and two lateral walls extending along the entire circumference of the rims of said wheel, each bead portion of said tire being seated in a corresponding seat of the rims of said wheel, and a circumferentially extending annular element mounted on each of said rims, at least a part of the axially outermost zone of said bead portion being radially compressed between the base of said channel-shaped seat and said annular element, the radially innermost diameter of said annular element being smaller than the radially outermost diameter of the axially outer lateral walls of said seat portion of said rims, said annular element comprising at least one shaped metallic element of curcular section embedded in a shaped rubber element, the cross section of said annular element being positioned eccentrically with respect to that of said shaped rubber element, said shaped rubber element being provided with an appendix intended to be received in an appropriate groove on the radially outer surface of the bead, said groove extending along the whole circumferential development of the bead.

2. A pneumatic tire and wheel assembly according to claim 1, wherein said shaped rubber element is at least as hard as the compound forming the bead.

* * * * *